United States Patent [19]

Stratton

[11] 4,273,051

[45] Jun. 16, 1981

[54] ELECTRIC DEVICE

[75] Inventor: Andrew Stratton, Farnborough, England

[73] Assignee: Imperial Chemical Industries Limited, London, England

[21] Appl. No.: 4,265

[22] Filed: Jan. 17, 1979

[51] Int. Cl.³ .......................... F42C 11/00; F23Q 7/00
[52] U.S. Cl. ............................ 102/202.2; 102/202.11;
 102/206; 361/248; 361/323; 361/305; 361/336; 361/73; 361/155
[58] Field of Search .................. 102/28 R, 28 P, 28 S, 102/28 A, 28 M, 28 ER, 28 WB, 203; 361/248

[56] References Cited

U.S. PATENT DOCUMENTS

| 2,976,485 | 3/1961 | Bartz | 361/248 |
| 3,171,063 | 2/1965 | Hutchinson | 102/28 R |
| 3,640,224 | 2/1972 | Petrick | 102/28 R |
| 3,762,331 | 10/1973 | Vlahos | 102/28 R |
| 4,141,297 | 2/1979 | Sellwood | 361/248 |

FOREIGN PATENT DOCUMENTS 1235844  6/1971  United Kingdom .................. 102/28 R Primary Examiner—Donald P. Walsh
Attorney, Agent, or Firm—Larry S. Nixon

[57] ABSTRACT

An electrically ignited load such as a fusehead is connected to the secondary winding of a transformer. The secondary winding is magnetically linked to a primary winding through a magnetic circuit and the transformer is constructed so as to provide a substantial leakage inductance associated with the secondary winding and effectively connected in series with the load to be ignited. The structure selectively passes electrical ignition energy to the load only in response to input electrical energy having predetermined magnitude and frequency characteristics.

44 Claims, 14 Drawing Figures

ELECTRIC DEVICE

RELATED APPLICATIONS

The subject matter of this application is related to co-pending, commonly assigned U.S. applications Ser. No. 39,445—Jones et al, filed May 15, 1979 and Ser. No. 109,109—Jones, filed Jan. 2, 1980.

This invention generally deals with electrical control circuits for energizing an electrically ignited load such as a fusehead in an explosive detonator. The circuit harmlessly dissipates electrical energy which is either accidentally or purposefully connected to the circuit input unless such energy is of predetermined magnitude and frequency.

The control circuit of this invention is especially useful and advantageous for firing an electrical ignition device, for example, an electric fusehead disposed in ignition relationship with one or more explosive charges. Such fusehead assemblies are used, for example, in blasting operations, seismic exploration and for the actuation of passive restraint systems in automobiles. In all such applications, it is important for the electrical load to be promptly actuated when desired but, at the same time, it is necessary to take safety precautions against inadvertent or improper load ignition.

In blasting operations and seismic exploration, explosive charges are usually detonated from a remote firing point to insure operator safety. The required electrical firing signal is transmitted to a detonator which explodes, and in turn, ignites the main explosive charge either instantaneously or after some predetermined time delay. The firing signal may also be transmitted, at least in part, in a non-electrical form by the burning of a pyrotechnic train and/or the propagation of a detonation wave through an explosive train.

The usual electric fusehead is ignited by electrical current passing through a fuse wire or metallic film. When sufficient electrical current passes through this essentially resistive load, its temperature is raised sufficiently to ignite a chemical composition disposed in contact with the wire. The ignition of the fusehead, per se, may then be used to initiate a sequence of pyrotechnic and/or explosive charges which eventually ignites or detonates the main explosive charge. The electrical energy for igniting the fusehead is commonly obtained from a battery, pulse generator, a.c. power supply or the discharge of a capacitor.

To insure operator safety throughout the storage and/or installation of explosive charges employing electric fuseheads, it is essential that actual ignition of the fusehead not occur until an authentic firing signal is generated. However, there are many possible sources of electrical energy that can cause accidental firing of such a fusehead. For example, in blasting operations there may be accidental or unauthorized direct connection with the battery or other source of a.c. or d.c. energy; induced currents from power wiring located in the vicinity of the blasting site; electromagnetic radiation from communication transmitters, radar installations and the like; and static electricity generated by the human operator or during the loading of a dry granular explosive. In automobile passive restraint systems, the automobile electric battery constitutes an especially serious hazard for accidental connection during maintenance or testing operations or the like.

The degree of safety associated with a given electric fusehead installation depends on both the sensitivity of the fusehead to ignition by spurious sources of electrical energy and the chance that such spurious sources will be encountered. Accordingly, in the past, one approach to safety has been to decrease the sensitivity of an electric fusehead by requiring high firing currents to ignite the pyrotechnic chemical disposed adjacent the wire or film which is heated by the flow of electrical currents. However, such an approach requires relatively heavy and expensive wiring and high firing energy levels which still fail to provide adequate safety for some operations. For example, the use of an electrical fusehead is normally prohibited in many mining operations where dry granular explosives are loaded by compressed air. Of course, such prior techniques of reduced fusehead sensitivity still permit the fusehead to be easily ignited either illegally or accidentally.

There have also been previous proposals for selectively energizing an electric fusehead in response to input electrical energy of a predetermined frequency. For example, U.S. Pat. No. 3,762,331 discloses a voltage step-down transformer in combination with capacitors and an inductor for selectively operating an electric fusehead at a frequency on the order of 10 kilohertz. The voltage ratio of the step-down transformer is fairly large (on the order of 100:1) so as to increase the voltage level required for firing and thus decrease sensitivity to spurious input voltages even if of the appropriate frequency. A series input capacitor is also used to block spurious d.c. voltages and to attenuate lower a.c. frequency signals (e.g., power frequencies). A shunt capacitor is also connected across the primary of the transformer to bypass the higher radio frequency signals which may appear across that winding said capacitor being selected to resonate with the primary inductance of the transformer at the operating frequency. A series input inductor is used to match input line impedances and to attenuate higher frequencies. Coupling transformers for use in such systems have also been designed so that magnetic saturation of the transformer core provides increased protection against improper fusehead ignition at the normal lower a.c. frequencies (e.g., a.c. power frequencies).

British Pat. No. 1,235,844—(published 1971) also shows a transformer coupled (pot-shaped core) a.c. input to an electric fusehead which ignites at a low 330 Hz. frequency generated integrally to the device from a direct voltage supply. Higher frequencies are attenuated by core losses.

The use of transformers with such large stepdown ratios limits the usefulness of such coupling devices where fusehead firing voltages on the order of 50 volts or more may be required. That is, in complex blasting operations, a series connection may not be usable due to the extremely large firing signal voltages that would have to be generated if the primaries of these transformers are connected in series. Such control circuits, typically incorporating components other than a transformer, are also often bulky and expensive and cannot be conveniently and economically incorporated within a detonator casing. For example, a typical design according to U.S. Pat. No. 3,762,331 requires a transformer primary inductance of 40 millihenries, a shunt capacitor of 6000 picofarads, a series capacitor of 4000 picofarads and a series input inductor of 200 millihenries. A design according to British Pat. No. 1,235,844 embodies inductors of 40-380 turns that will typically have inductances in the 5-500 millihenry range, together with semiconductors, resistors and a capacitor.

Protection against high energy static discharge is particularly significant for blasting operations. It is common to test such control circuits in combination with an electrical fusehead by discharging a capacitor across the circuit input. Some such testing protocos are so stringent as to require the circuit to effectively ignore or suppress the discharge of as much as 20–30 kilovolts from a 2,000 picofarad capacitor. The energy of 0.5–1 Joule stored in the capacitor has to be dissipated harmlessly in the control circuit without, typically, more than a few millijoules reaching the load. Means for dissipating such a high proportion of the applied energy must accordingly be frequency selective if excessive energy is not to be required for normal operation. The higher the frequency of the oscillatory discharge from the capacitor the easier it is to obtain this discrimination. The high values of inductance used in the prior art give a frequency of discharge from a 2000 pf capacitor that is not far removed from the operating frequency and thereby severely limit the selective energy dissipation that can be achieved. Control circuits according to U.S. Pat. No. 3,762,331, in particular, contain inductive and capacitative elements designed to resonate at and near to the operating frequency.

Control circuits according to British Specification 1,235,844 contain circuit elements specifically designed to generate a firing signal of the appropriate frequency, and such circuits would be directly energized by a condenser discharge of the appropriate polarity.

Accordingly, such prior art detonators remain vulnerable to accidental ignition during transport storage and connection into a given blasting arrangement and offer only limited, if any, protection against high energy static discharge.

Now, however, with the discovery of the present invention, an electrically ignited load (e.g., an electric fusehead) can be more safely manufactured, transported, stored and connected into a blasting system. At the same time, it is economically and physically feasible to incorporate the electrical control circuit of this invention with an electric fusehead in an explosive detonator casing.

In general, the circuit of this invention is similar to the prior art use of a coupling transformer where a.c. electrical energy is input to the primary winding to fire an electric fusehead connected to the secondary winding. However, the transformer structure of this invention is specially constructed so as to provide a substantial leakage inductance (usually associated with the secondary winding) effectively connected in series with the electric fusehead. A substantial leakage inductance may come about by special transformer core construction techniques and/or by the provision of a completely separate magnetic circuit (usually linked to the secondary winding).

Since the normal electric fusehead resistance is quite low (e.g., on the order of 1 ohm or so) it is somewhat difficult to use low inductance resonate circuit structures to limit fusehead ignition to a predetermined frequency of input signals. However, by effectively providing a series inductance (e.g., the leakage inductance associated with the secondary transformer winding), higher frequency signals are increasingly blocked from the fusehead (e.g., the major voltage occurs across the inductance rather than the fusehead). Furthermore, since an inductance (secondary inductance less leakage inductance) is also effectively connected across the circuit input, lower frequency signals are increasingly shunted away from the fusehead load.

While the series inductance and shunting inductance just discussed tend to isolate the fusehead from electrical currents and voltages other than that having a predetermined magnitude and frequency, there is still a need to harmlessly dissipate such undesired energy particularly from a capacitor discharge. This required energy dissipation can be accomplished, at least in part, by designing the transformer so that significant core losses occur, especially at unauthorized frequencies and/or signal levels. For example, core losses are increased whenever the core becomes magnetically saturated.

The dissipation that can be achieved in a transformer without substantial series inductance in the secondary, however, gives insufficient protection against the level of capacitor discharge previously cited. The dissipation is increased by a large factor through the series inductance, particularly if the said inductance also has substantial core loss at the capacitor discharge frequency.

In addition to magnetic dissipation, an electrical energy dissipating circuit (either linear or non-linear with respect to applied voltages) may be connected directly in the circuit, e.g., across the primary or secondary winding or across the leakage inductance.

A fusable link may also be connected in series with the primary or in series with another or even tertiary winding of the transformer to provide added protection against input current of excessive magnitude.

The control circuit of this invention selectively couples electrical energy to an electrically ignited load by highly attenuating sources of electrical energy other than one of a predetermined magnitude and frequency. This invention is believed to achieve such desired safety requirements in a more reliable and economic manner than has heretofore been possible.

These and other objects and advantages of this invention will be more completely appreciated and understood by reading the following detailed description taken in conjunction with the accompanying drawings, of which:

Figure 1:
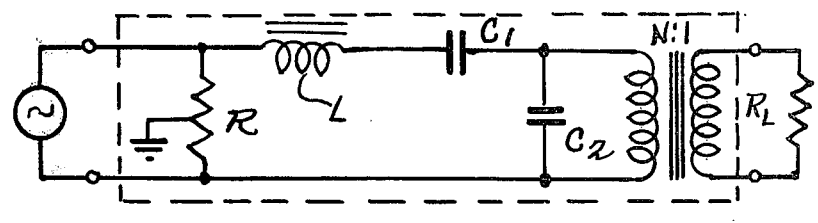
FIG. 1 is a schematic diagram of a prior art control circuit for selectively energizing an electrical fusehead.
Figure 4:
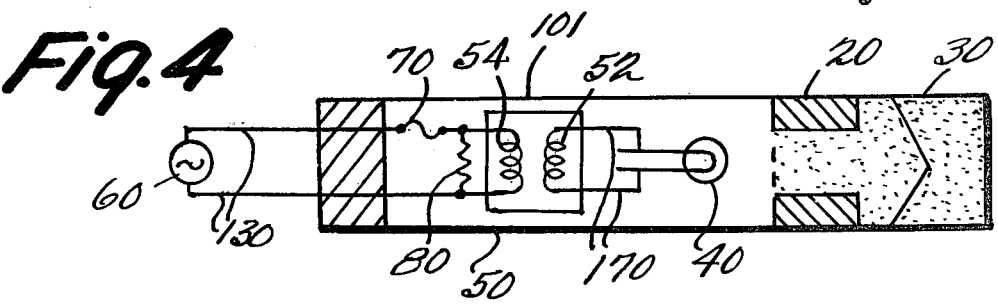
FIG. 4 is a diagrammatic longitudinal medial section of a detonator having a transformer a.c. coupled fusehead in accordance with this invention.
Figure 5:
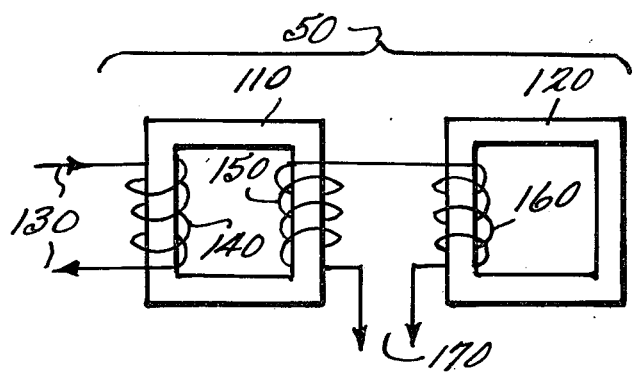
Figure 6:
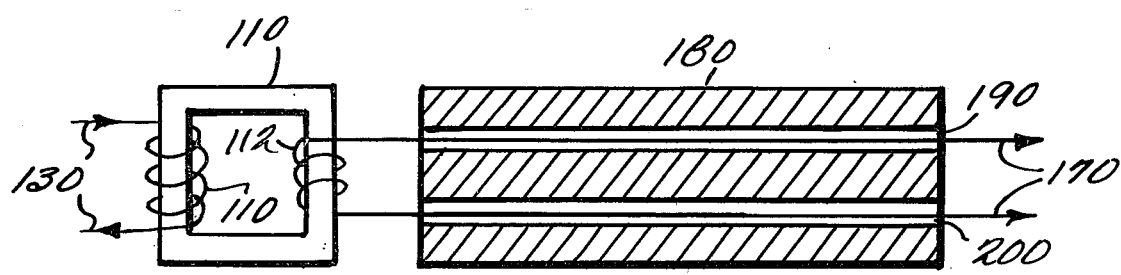
Figure 7:
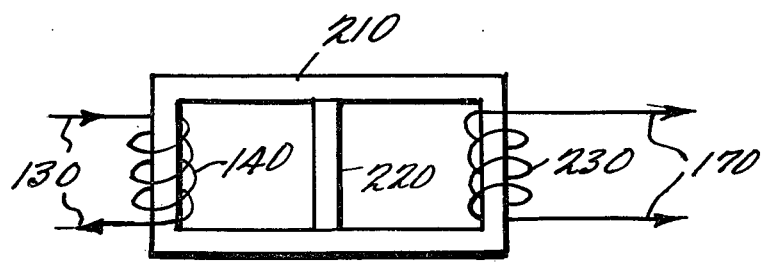
Figure 8:
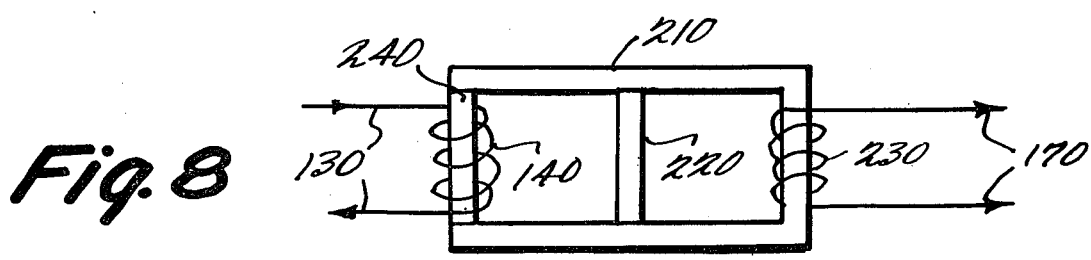
Figure 9:
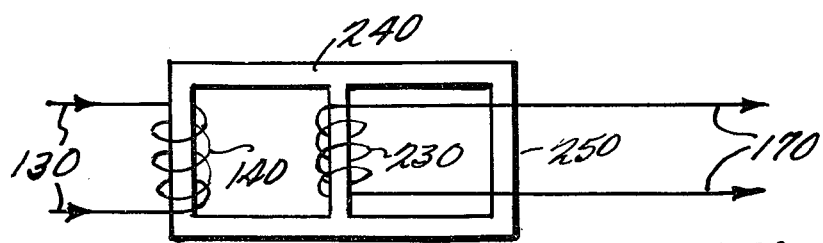
Figure 10:
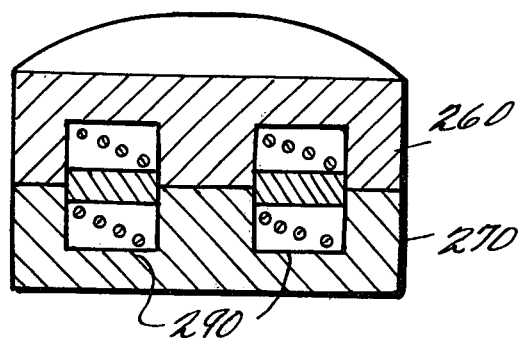
Figure 11:
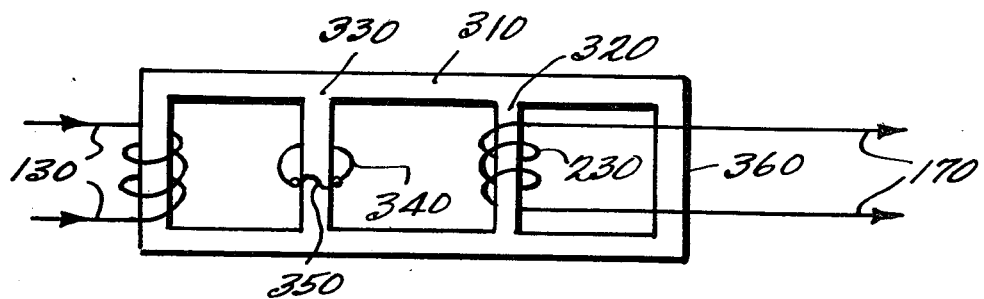
Figure 13:
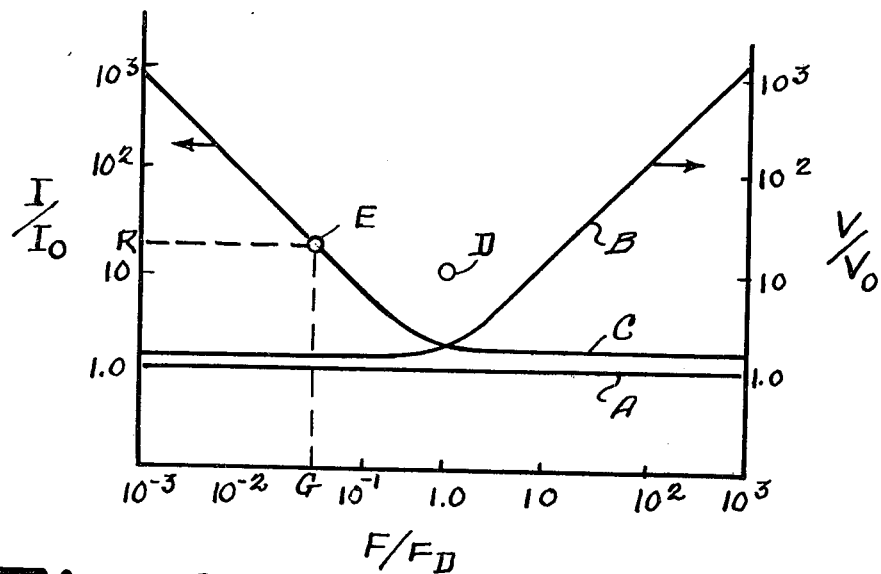
Figure 14:
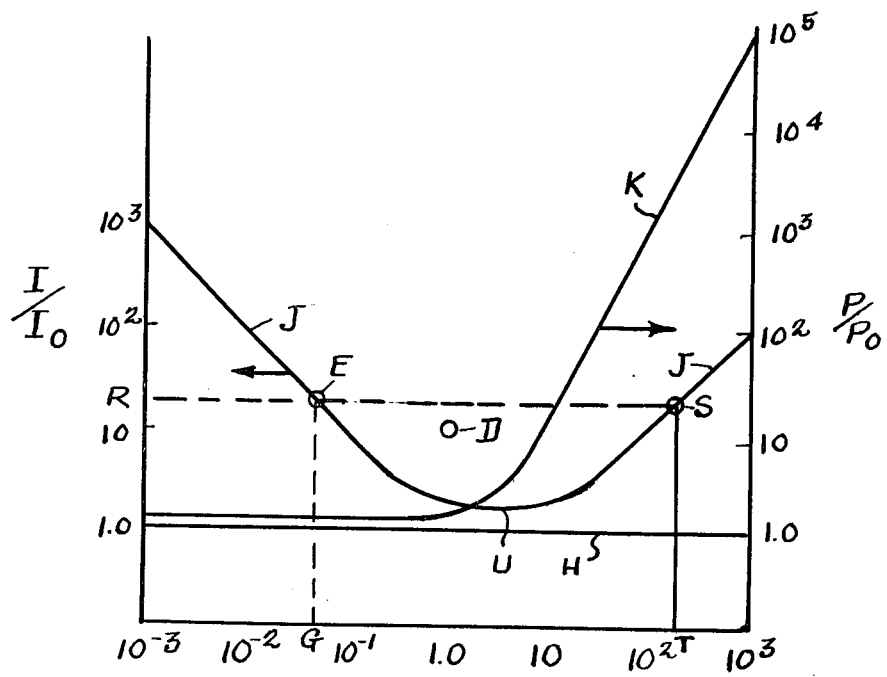

FIGS. 5–12 inclusive diagrammatically depict various transformer structures which may be used in the detonator of FIG. 4, the transformers of FIGS. 8, 9 and 11 being modifications of the transformer shown in FIG. 7;

FIG. 13 is a graph showing the current and voltage firing characteristic curves for the fusehead of FIG. 1 without a resistive energy dissipation circuit connected across the primary or secondary winding of the transformer; and FIG. 14 is a graph showing the current and power firing characteristic curves for the fusehead of FIG. 1 with a resistive energy dissipation circuit connected across either the primary or secondary winding of the transformer.

The prior art circuit of FIG. 1 is of the type disclosed in U.S. Pat. No. 3,762,331 and has already been discussed above. Capacitor C1 effectively blocks d.c. input signals and capacitor C2 acts to shunt radio frequency signals being resonant with the primary inductance of the transformer at the operating frequency. Inductor L tends to block higher frequency a.c. inputs and match the impedance of the input signal line and resistance R bleeds static charges to ground. The fusehead is denoted as the resistive load $R_L$.

Figure 2:
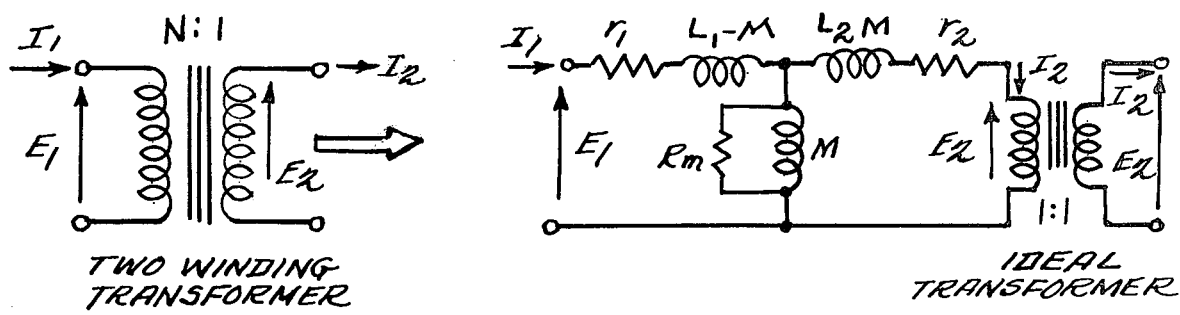
FIG. 2 is a schematic diagram showing an equivalent circuit for a two winding transformer.

It is, of course, also well-known that a practical two winding transformer of the type shown in FIG. 1 may be represented by an equivalent circuit as shown in FIG. 2. The resistances $r_1$, $r_2$ and $R_m$ are due to core losses and resistive winding losses. D.c. isolation and a.c. coupling is provided by an ideal unit ratio transformer. $L_1$ is the primary inductance, $L_2$ the secondary inductance and the shunt inductance M is related to the mutual coupling between the primary and secondary windings of the transformer.

The characteristics of the transformer as a four terminal network are determined by, the open circuit voltage ratio $E_1/E_2 = N$ the coupling coefficient $K = \sqrt{L_1 L_2}/M$ and either the primary or secondary inductance. In the equivalent circuit form of FIG. 2 one or other of the inductances $(L_1-M)$, $(L_2-M)$ may be negative, in which case the transfer characteristics can only be physically realized through the mutual magnetic coupling of a transformer. If, however, $N \geq 1$ and $K^2 N \leq 1$ the transfer characteristics of the transformer may be physically realized by a T network of inductors $(L_1-M)$, $(L_2-M)$ and M, and the transformer discarded if d.c. isolation between primary and secondary circuits is not required.

In normal transformer design, the coefficient of coupling K is kept as close to unity as possible, a value of 0.998 being common. Departure from unity arises due to magnetic flux from the primary winding following a path through non-magnetic winding insulation or air gaps that does not link with the secondary winding (and vice-versa). In British Pat. No. 1,235,844, a leakage path that might appear to be substantial through interposing a stainless steel sheet between primary and secondary magnetic circuits will be equivalent to an air leakage path of low inductance, because of the non-ferromagnetic properties of stainless steel (relative permeability very close to unity).

Such insignificant inherent leakage inductances are insufficient to provide the protection afforded by this invention for which coupling coefficients in the range $K = 0.9$–$0.5$ are typically used.

Figure 3A:
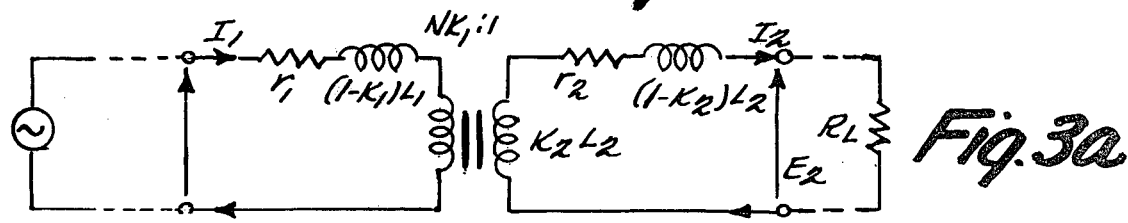
FIG. 3 is a schematic diagram of an electrical control circuit according to this invention.

For example, as shown in FIG. 3(a), a transformer with leakage inductance may be represented by a unit coupled transformer with a primary leakage inductance $(1-K_1)L_1$ in series with the generator and a secondary leakage inductance $(1-K_2)L_2$ in series with the load. The equivalent resistive loss in the primary is shown as $r_1$, and the equivalent resistive loss in the secondary as $r_2$. The primary leakage inductance will include the inductance of conducting leads that are an integral part of the detonator fusehead assembly, the natural leakage of the transformer and an additional series inductance if desired. The secondary leakage inductance will include the natural leakage of the transformer and an additional series inductance.

While the desired voltage attenuation $|E_1|/|E_2|$ resulting from leakage inductance depends only on the product $K^2 = K_1 K_2$ and thus may equally be provided by primary or secondary leakage inductance, a secondary leakage inductance is much more effective than primary leakage inductance in bringing about harmless dissipation of energy from a capacitor discharge.

Figure 3B:
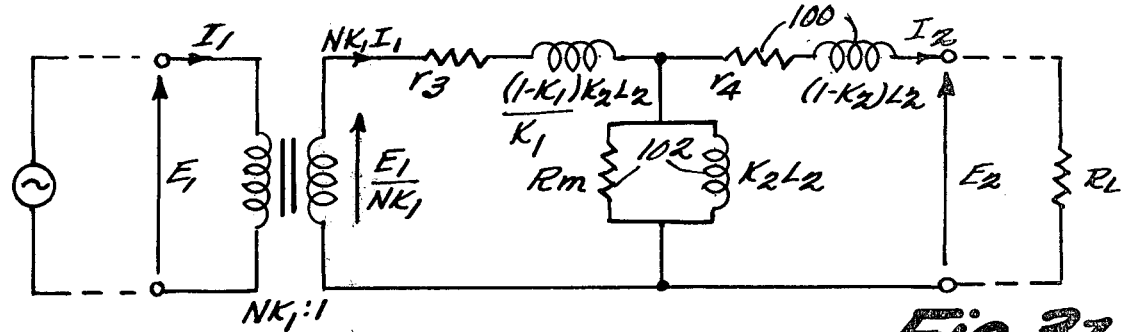

FIG. 3(b) shows the secondary circuit that is equivalent to FIG. 3(a) wherein this invention provides a protective series connected inductance 100, with an equivalent series loss resistance $r_4$ with the fusehead load denoted as resistance $R_L$.

As earlier indicated, the fusehead may be a very low resistance on the order of one ohm or so. In addition, the circuit of this invention as depicted in FIG. 3(b) includes a shunt inductance 102 with an equivalent shunt resistance $R_m$. The inductor 102 may be physically realized through the secondary of the transformer, or an inductor connected as shown. In the latter arrangement the transformer may be omitted if d.c. isolation of primary and secondary circuits is not required.

As the input frequency rises above a predetermined operating frequency, due to the presence of the protective inductance 100, an increasing magnitude of voltage must be applied to actuate or ignite the load RL. Thus, protection against spurious operation by frequencies above the predetermined operating frequency increases as the ratio of the protective inductance reactance to the reactance of winding 102 increases. That is, as $K_2$, and hence the coupling coefficient, decreases. Conversely, as the a.c. input frequency decreases relative to the designed operating frequency, inductance 102 increasingly shunts such inputs and requires increasing levels of input signals for ignition of the load RL. Accordingly, protection against spurious operation due to inputs below the predetermined operating frequency increases as the ratio of the reactance of winding 102 to the resistance of load RL decreases.

Virtually complete protection against actuation of load RL from a.c. sources having frequencies less than, for example, 500 hertz may be achieved by providing a fusable link in series with the input. For example, the link may be designed to fuse or break whenever the input current and/or current in inductor 102 rises above the normal operation by a significant amount. Characteristics of the fusable link (e.g., the fusing current), its positioning within the circuit and the sensitivity load RL then determine the minimum predetermined operating frequency. For example, the 500 hertz low frequency protection limit could be increased if a corresponding increase is made in the predetermined design operating frequency. Protection from spurious input signals at higher frequencies and against capacitor discharge testing procedures obtains through the equivalent shunt resistance $R_m$ that may be an element connected in parallel with either the primary or secondary winding. The resistive element may also dissipate a proportion of the applied energy even at the predetermined operating frequency. However, due to the presence of protective inductance 100, as the input signal frequency increases above the predetermined operating frequency, the ratio of energy dissipated in the resistive element to the energy dissipated in the electrical load RL increases. The relative degree of protection will be increased if the resistive element has a non-linear characterstic with resistance decreasing as applied voltage increases (e.g., a zener diode, spark gap, etc.). The energy dissipation, other than in the load, will be increased further if a resistive element with the aforesaid characteristics is connected in shunt with inductor 100.

The magnetic circuits associated with one or both of inductors 100 and 102 may comprise a magnetic material (e.g., manganese—zinc or nickel—zinc ferrite) which has a loss component of magnetic permeability at frequencies above the designed operating frequency. In this manner, further energy is dissipated at higher frequencies. It is a characteristic of the design that inductors typically of 1–50 microhenries can be used, thereby increasing the frequency of capacitor discharge compared with the prior art. Increased energy may also be dissipated at lower than the predetermined operating frequency if the magnetic circuit(s) are designed to saturate at the higher current levels which flow at lower frequencies.

The degree of protection against higher level spurious inputs is also enhanced if at least the magnetic circuit associated with inductor 102 is formed from a magnetic material which saturates at approximately the flux density required to produce a firing current through inductor 100 to ignite the load RL.

To fire an electric fusehead in a detonator, the saturation flux density in the magnetic circuit(s) should be significantly above but close to the peak a.c. flux density required for providing minimum firing current through inductor 100 within the time delay from initial signal input (lag time) which is permitted for firing the particular detonator at hand. At the same time, from the above discussion, it should be appreciated that saturation of the magnetic circuit associated with the protective inductance 100 will decrease the degree of protection afforded by the circuit to higher frequency spurious inputs.

The circuit of this invention may be formed from a transformer having primary and secondary windings and also including a third magnetic circuit which is magnetically linked with at least part of the primary winding but not with the secondary winding. Such third magnetic circuit would then provide a further protective series inductance associated with the primary winding. Such a third magnetic circuit would also preferably link a tertiary winding which includes a fusable link as shown in FIG. 11. The fusable link is then designed to fuse at a predetermined current in the primary winding which exceeds the required firing current for the fusehead. This link in a tertiary winding may be an addition to or in place of the fusable link in the primary winding earlier discussed.

The secondary winding may also be connected indirectly to the electrically ignited load or fusehead. For example, the secondary winding may be coupled to an energy storage means (e.g., a rectifier connected to a capacitor), with the energy storage means being connected, in turn, through a switch to the electrically ignited load or fusehead. For example, the switch may be operated by an electronic timing means.

To construct a detonator according to this invention, the primary and secondary windings or other inductive elements are selected to provide a desired degree of protection in accordance with the firing characteristics of a particular fusehead (firing element, firing energy, lag time, etc.) and with due consideration to the type of input signals against which protection is required. In general, such a detonator should be protected against electric batteries, alternating power supplies, radio frequencies in excess of 100 kilohertz and capacitor discharges. In practice, the optimum range of operating frequencies may be between 5 and 15 kilohertz. The protective inductances formed either separately or as an effective part of other inductive elements are therefore designed to control the rate at which current in the secondary winding can increase whenever current in the primary winding rises rapidly so as to limit energy transfer to a safe value at frequencies higher and lower than the designed predetermined operating frequency.

Either a resistive element (e.g., connected in parallel with the primary winding) and/or the loss component of a magnetic circuit are represented by the equivalent shunt resistance $R_m$ and equivalent series resistance $r_4$ in FIG. 3(b), in FIG. 3 and are selected to give increasing energy dissipation for higher relative rates of increase of input current. At the same time, the inductance of a secondary winding (including the protective or leakage inductance) is chosen so as to increase the required current in the primary winding whenever it rises at a slower rate thus enabling a fusable link to be selected which will fuse at lower frequencies before the electrical load is ignited while, at the designed predetermined operating frequency, the load will be ignited before the fusable link fuses.

Where magnetic circuits associated with inductor 102 are easily saturated, the saturation characteristics are chosen so, that at the predetermined operating frequency, the difference in magnitizing current flowing in the primary winding and the transformed current flowing in the secondary winding brings the flux in the magnetic circuit of inductor 102 near the saturation level. Then, for example, if a spurious input from an a.c. power supply rapidly increases the current in the primary winding, its associated core material will saturate thus causing the rate at which magnetic flux increases to fall rapidly below the rate at which the magnitizing field is being increased and thus causing the induced voltage resulting from mutual linkage with the saturated magnetic circuit to quickly fall towards zero and prevent ignition of the load. At high frequencies (as typically encountered with capacitive discharge testing techniques), very short voltage pulses are produced. However, due to the protective or leakage inductance in series with the load, insufficient energy is transferred for load ignition. At the same time, for testing purposes, the continuity of the fusable link and/or resistive energy dissipating elements may be established by impedance measurements to insure that the control circuit has not been damaged by a spurious signal.

The detonator of FIG. 4 has a tubular metal casing 101 containing a delay element 20, explosive charge train 30, fushead 40 and transformer 50. The transformer secondary winding 52 is connected through lead wires 170 to the fuse head ignition element 40 and the primary winding 54 is connected by lead wires 130 to a source of alternating (a.c.) current 60. A current limiting fusible link 70 is included in series with wires 130 to provide further protection against accidental direct coupling of the input to a power circuit. An energy dissipation means such as resistor 80 is connected across leads 130 to increase energy dissipation at high frequencies.

In the transformer of FIG. 5 a primary winding 140 is connected to an a.c. source of firing energy through wires 130 and a secondary winding is in two serially connected parts 150 and 160 that are connected by wires 170 to the ignition circuit of the fusehead 40 (FIG. 4.) The first magnetic circuit 110 links the primary winding 140 and part 150 of the secondary winding. The second magnetic circuit 120 provides self-linkage to part 160 of the secondary winding and thus provides increased leakage inductance in the secondary winding.

In the transformer of FIG. 6, wire portions 190 and 200 constitute part of the secondary winding and pass through holes in a cylinder 180 of magnetic material, the primary wnding 140 and part 150 of the secondary winding being arranged as in FIG. 5. Flux generated in material 180 by current in wire portions 190 and 200 is self-linked and the cylinder 180 thus constitutes a second magnetic circuit providing increased leakage inductance in the secondary winding.

In the transformer of FIG. 7 a primary winding 140 is linked to a secondary winding 230 through a first magnetic circuit 210. A magnetic shunt 220, which may be of material different from that of magnetic circuit 210, completes a second and third magnetic circuit for self-linkage of flux through the secondary winding 230, as well as that of the primary winding 140, thereby providing increased leakage inductance in both windings.

In the transformer of FIGS. 5–7 inclusive, the first magnetic circuit may be constructed from a material which reaches saturation at a predetermined design level of primary current. However, in the transformer of FIG. 8, while part 240 of the magnetic circuit is constructed from such magnetic material, (e.g., saturated at a design level of current), the remainder of the magnetic circuit is made of less readily saturable material.

In the transformer of FIG. 9, the magnetic shunt 250 is external to the first magnetic circuit linking primary winding 140 and secondary winding 230. Thus, as compared with FIG. 7, the ratio of leakage flux in the second magnetic circuit to mutual flux is increased and the ratio of primary leakage flux in the first magnetic circuit to mutual flux is decreased.

In the transformer of FIG. 10 the first magnetic circuit is provided by a pot core that can be separated into two parts 260 and 270 containing a primary winding 280 and a secondary winding 290 respectively (shown in cross-section in FIG. 10). A ring of magnetic material 300, constitutes a magnetic shunt and therby provides a second and a third magnetic circuit similar to that of FIGS. 7 and 8.

In the transformer of FIG. 11, a further magnetic shunt 330 has been introduced into the arrangement of FIG. 9 and constitutes a magnetic circuit providing increased leakage inductance in the primary winding 140 additional to that provided by shunt 360. A single turn of wire 340 links the flux in shunt 330, the circuit being completed by fusible link 350. When the link is complete, the current induced in wire 340 by flux (induced by primary current) in shunt 330 generates an opposing flux and reduces the total flux in shunt 330 to a small fraction of the primary flux. Under high primary currents that saturate the first magnetic circuit, the link 350 fuses before a firing current is reached thereby interrupting the current in wire 340 and increasing the flux in shunt 330, decreasing the primary current and protecting the primary winding against excessive current.

Figure 12:
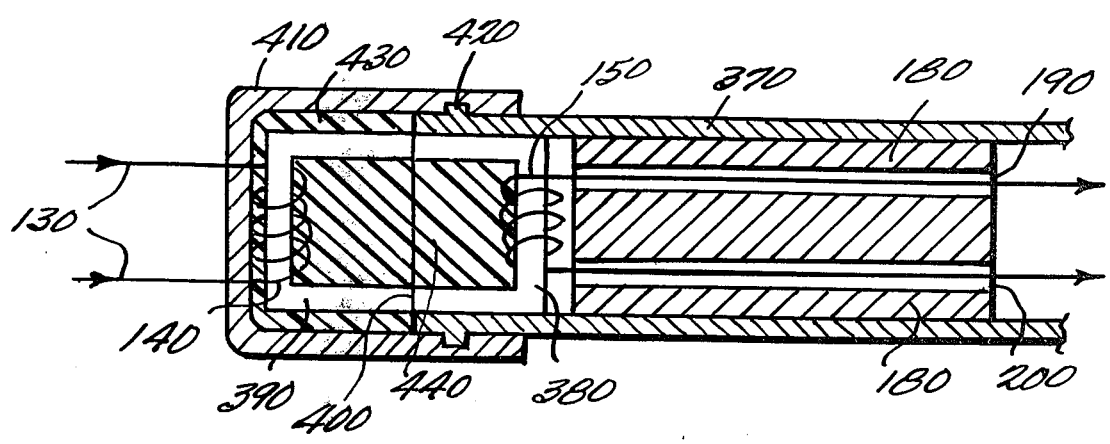

In the detonator arrangement of FIG. 12 a transformer similar to that shown in FIG. 6 is mounted in a detonator casing 370. The first magnetic circuit is divided at 400, the part 380 with secondary winding 150 being sealed with sealing compound 440 into the detonator casing. The second portion 390 of the first magnetic circuit with the primary winding 140 is sealed with sealing compound 430 into a cap 410. The two parts 380 and 390 are held together locking the cap 410 to the detonator case 370 with pins 420 in a bayonet connection. The first magnetic circuit may be designed so that the part 380 is the first to reach a saturation flux, thereby giving protection against lower frequency energy sources before the firing input is attained.

The characteristic curves shown in FIGS. 13 and 14 indicate relationships between operating voltage for normal firing, the required fusible link fusion current, and the effect of the energy dissipating resistor.

In FIG. 13 FD denotes the designed operating frequency, F denotes the frequency of the applied a.c. signal; I denotes the root mean square a.c. current flowing continuously through wires 13; $I_o$ denotes the maximum safe (no-fire) root mean square a.c. current flowing continuously through the fusehead; V denotes the root mean square voltage applied continuously to the input wires 13; and $V_o$ denotes the maximum safe (no-fire) root means square voltage that can be applied continuously to the fusehead. All scales are logarithmic.

Line A denotes the value $I_o$ and $V_o$, all values of I and V below this line being safe. Line B denotes the maximum safe (no-fire) value of V relative to $V_o$ and line C denotes the maximum safe (no-fire) value of I relative to $I_o$ when the fusehead is connected to a source of a.c. firing voltage and current in accordance with the invention. All combinations of I and V that lie below lines B and C are safe and it will be observed that the protection against spurious current increases as F/FD decreases and protection against spurious voltage increases as F/FD increases.

Point D represents a typical combination of firing current and voltage for the fusehead, and point E represents the fusing current R for a fusible link 70 at a value of F/FD represented by G. For frequencies less than G, the fusible link 70 will fuse but the fusehead will not fire. At F/FD corresponding to point D the current required to fire the fusehead is less than the current corresponding to point E required to fuse the fusible link 70 by sufficient margin to ensure that the fusible link 70 remains intact.

In FIG. 14 F, FD, I and $I_o$ have the same designations as in FIG. 13. P denotes continuous flow of power to the input wires 13 and $P_o$ denotes the maximum safe (no-fire) continuous flow of power that can be applied to the fusehead.

In comparison with FIG. 13 it will be observed that P is the product of I,V and the cosine of the phase angle between I and V. All scales are again logarithmic.

Line H denotes the value $I_o$ and $P_o$, all values of I and P below Line H being safe, Line J denotes the maximum safe (no-fire) value of I relative to $I_o$ and Line K denotes the maximum safe (no-fire) value of P relative to $P_o$ when the fusehead is connected to a source of a.c. power in accordance with the invention. All combinations of I and P that lie below lines J and K are safe and it will be observed that the protection against spurious current increases both as F/FD increases and decreases and that for frequencies above FD the firing power rises rapidly with frequency.

Points D, E, and G have the same designations as in FIG. 13. Point S represents the fusing current R for a fusible link 70 at a value of F/FD represented by T. For frequencies less than G or greater than T the fusible link 70 will fuse but the fusehead will not fire.

Dependent on the external circuit conditions either complete protection or a high degree of protection will be obtained against energy from capacitor discharge (whether oscillatory or aperiodic). It will be understood that, depending on the combination of power frequency, radio frequency and capacitor discharge operating frequency FD may be arranged to fall at other points on curve J, for example, the minimum point U.

Although only a few exemplary embodiments of this invention have been described in detail above, those skilled in the art will appreciate that many modifications and variations in these embodiments may be made without departing from the novel and advantageous features of this invention. Accordingly, all such variations and modifications are intended to be included within the scope of the following claims: cm I claim:

1. An electrical control circuit for selectively energizing an electrically ignited load only in response to input electrical energy from an a.c. source having predetermined electrical parameters, said control circuit comprising:
   first and second inductors having mutual linkage therebetween,
   said first inductor being adapted for connection to said a.c. source,
   said second inductor being adapted for connection to said load,
   at least one of said first and second inductors being constructed and constructed and connected in circuit to provide a substantial protective inductance effectively connected in series with said load, and
   an energy dissipation means, effectively coupled to said at least one inductor, for dissipating input electrical energy as a function of the voltage across and/or current though at least one of said first and second inductors.

2. An electrical control circuit as in claim 1 wherein said second inductor comprises electrically conductive wires and a separate magnetic circuit self-linking at least a portion of said wires.

3. An electrical control circuit as in claim 1 wherein:
   said first inductor comprises a first magnetic circuit which, at least in part, magnetically saturates when a predetermined excessive level of electrical current flows in said first inductor, and
   said second inductor comprises a second magnetic circuit which does not magnetically saturate when said predetermined level of electrical current flows in said first inductor.

4. An electrical control circuit as in claim 3 wherein said second inductor comprises electrically conductive wires and a separate magnetic circuit self-linking at least a portion of said wires.

5. A control circuit as in any of claims 1–4 wherein at least one of said magnetic circuits comprises a ferrite material having apertures through which electrically conductive wires pass.

6. A control circuit as in any of claims 1–4 wherein said first and second inductors comprise: a cylinder of magnetically permeable material, an inner center post, and a disc disposed about said post defining two spaced apart toroidal cavities, in which cavities windings of said first and second inductors are respectively located.

7. A control circuit as in any of claims 1–4 comprising a fusible link in series with said first inductor.

8. A control circuit as in any of claims 1–4 comprising a tertiary winding magnetically coupled to at least one of said first and second inductors and connected in series with a fusible link.

9. A control circuit as in any of claims 1–4 comprising an energy dissipating electrical circuit connected to all or part of at least one of said first and second inductors.

10. A control circuit as in any of claims 1–4 included in an explosives detonator and casing therefor, said load being an electrical fusehead for said explosives detonator.

11. An electrical control circuit for selectively energizing an electrically ignited load only in response to input electrical energy having predetermined electrical characteristics, said control circuit comprising:
    a transformer including a magnetically permeable structure, a primary winding adapted for connection to a source of electrical energy, and a secondary winding adapted for connection to said load, both said windings being magnetically coupled to said magnetically permeable structure,
    said transformer being constructed so as to provide a substantial leakage inductance associated with at least one of said primary and secondary windings.

12. A control circuit as in claim 11 comprising a second magnetically permeable structure magnetically coupled to said secondary winding whereby its effective leakage inductance is increased.

13. A control circuit as in claim 12 wherein said second magnetically permeable structure is a ferrite material having apertures through which wires of said secondary winding pass.

14. A control circuit as in claim 11 wherein said magnetically permeable structure includes a path for self-linking leakage flux associated with said secondary winding.

15. A control circuit as in claim 11 wherein said magnetically permeable structure comprises a cylinder having an inner center post and a disc thereabout defining two spaced apart toroidal cavities, in which cavities said primary and secondary windings are respectively located.

16. A control circuit as in any of claims 11–15 comprising a fusible link in series with said primary winding.

17. A control circuit as in any of claims 11–15 comprising a tertiary winding magnetically coupled to said magnetically permeable structure and connected in series with a fusible link.

18. A control circuit as in claim 11 comprising an energy dissipating electrical circuit connected across at least one of said primary and secondary windings.

19. A control circuit as in any of claims 11–15 or 18 included in an explosives detonator and casing therefore, said load being an electrical fusehead for said explosives detonator.

20. An electrical control circuit for selectively energizing an electrically ignited load only in response to input electrical energy having a predetermined frequency, said control circuit comprising:
    a first inductor adapted for connection with a source of electrical energy,
    a second inductor adapted for series electrical connection with said load and coupled to said first inductor for receiving energy supplied from said source, and
    an energy dissipation means effectively coupled to at least one of said first and second inductors for dissipating input electrical energy as a function of the voltage across and/or current through at least one of said first and second inductors,
    said first inductor increasingly shunting input electrical energy from said load as frequency is decreased and said second inductor having sufficient relative inductance to increasingly block input electrical energy from reaching said load as frequency is increased such that only input electrical energy of said predetermined frequency is sufficiently coupled to said load to cause its ignition.

21. A control circuit as in claim 20 wherein said first and second inductors comprise first and second windings respectively with mutual magnetic coupling therebetween.

22. A control circuit as in claim 21 wherein said second winding is linked by a substantial amount of magnetic flux which flux does not also link said first winding.

23. A control circuit as in claim 20 wherein said energy dissipation means comprises a magnetically permeable material magnetically coupled to at least one of said first and second inductors.

24. A control circuit as in claim 23 wherein said magnetically permeable material includes a ferrite material.

25. A control circuit as in claim 20 wherein said energy dissipation means comprises a resistive element electrically connected to at least one of said first and second inductors.

26. A control circuit as in claim 20 wherein said second inductor has an inductance substantially greater than 1/100 of the inductance of said first inductor.

27. A control circuit as in claim 20 wherein said first and second inductors each comprise magnetically permeable material.

28. A control circuit as in claim 27 wherein at least a portion of said magnetically permeable material is magnetically coupled to only one of said first and second inductors.

29. A control circuit as in claim 27 wherein at least a portion of said magnetically permeable material comprises a body composed of a ferrite material having apertures therein through which pass the windings of at least one of said first and second inductors.

30. A control circuit as in any of claims 20-29 wherein said first and second inductors and said energy dissipation means is constructed as a transformer having a magnetically permeable structure proving a magnetic circuit for both mutual magnetic coupling between said first and second inductors and substantial self-linking flux through at least one of said inductors thereby increasing the leakage inductance of the transformer, said magnetically permeable structure also dissipating energy due to the passage of magnetic flux therethrough which energy dissipation increases as the structure becomes saturated with magnetic flux.

31. A control circuit as in claim 30 wherein said magnetically permeable structure comprises at least three sections with said first and second inductors comprising corresponding first and second windings encompassing only two of said three sections.

32. A control circuit as in claim 31 wherein at least two of said three sections are included in separate mechanical structures which are functionally assembled to form said control circuit.

33. A control circuit as in claim 32 wherein said magnetically permeable structure comprises:
a cylinder having a center post thus forming a toroidal cavity therewithin, said cylinder being separable into two parts along a plane transverse to the cylinder axis, and
a ring-shaped member which fills a center portion of the toroidal inner cavity so as to define two toroidal inner subcavities separated by said ring-shaped member.

34. A control circuit as in claim 33 wherein each of said first and second inductors comprise a winding disposed in a respectively associated one of said two toroidal inner subcavities.

35. A control circuit as in claim 20 comprising a fusible link in series with said first inductor to protect against excessive input currents.

36. A control circuit as in claim 20 comprising a third inductor magnetically linked with said first inductor and short circuited through a fusible link to protect against excessive input currents.

37. A control circuit as in any of claims 20-29 wherein said load is an electrical fusehead and comprising an explosives detonator and casing therefor housing said fusehead and said control circuit.

38. A system for selectively operating an electrically ignited load circuit from an a.c. source, said system comprising:
inductive circuits for coupling the load to said source,
said inductive circuits having a first winding connected to said source and a second winding, at least part of which may be common with the first, said second winding being connected to the load circuit, and
first and second magnetic currents,
at least part of said first and second windings being linked to said first magnetic circuit and at least part of said second winding being linked to said second magnetic circuit,
said second magnetic circuit not being linked by the first winding and thereby providing a protective series inductance as an effective part of the second winding.

39. An electric device for selectively activating an electrical load circuit, said device comprising:
an electric load circuit,
inductive circuits in the form of a transformer having a first winding adapted for connection to a source of electrical energy and a second winding connected to said load circuit,
a first magnetic circuit mutually linking at least part of said first and second windings, and
a second magnetic circuit self-linking at least part of said second winding, which second magnetic circuit is not magnetically linked to the first winding thereby providing a protective series inductance as part of said second winding.

40. An electric device for selectively activating an electrical load circuit, said device comprising:
an electric load circuit,
inductive circuits having a first winding adapted for connection to a source of electrical energy and a second winding which includes at least part of the first winding,
said second winding being connected to said load circuit,
a first magnetic circuit linking that part of the first winding that is included in the second winding, and
a second magnetic circuit linking that part of the second winding that does not include the first winding, which second magnetic circuit is not linked to the first winding thereby providing a protective series inductance as part of said second winding.

41. A device as in claim 40 wherein:

the electric load circuit is the ignition circuit of an electric fusehead, at least the second winding of the inductive circuits, the second magnetic circuit and, at least part of the first magnetic circuit is assembled with the fusehead and explosive charges in a detonator.

42. A device as in claim 41 wherein the magnetic circuits and the first and second windings are contained within the detonator casing.

43. A device as in claim 41 wherein:

said second magnetic circuit, the whole second winding and a first part of the first magnetic circuit are within the detonator casing, the first winding and a second part of the first magnetic circuit are outside the detonator casing, and means are provided for detaching and reattaching said second part and the first winding.

44. A device as in any of claims 41–43 wherein at least part of the inductive circuits comprise external leading wires of the electric detonator.

* * * * *

UNITED STATES PATENT AND TRADEMARK OFFICE
CERTIFICATE OF CORRECTION

PATENT NO. : 4,273,051

DATED : June 16, 1981

INVENTOR(S) : Andrew Stratton

It is certified that error appears in the above—identified patent and that said Letters Patent is hereby corrected as shown below:

In the cover sheet, insert data item 30:

--[30] Foreign Application Priority Data
February 1, 1978 [GB]
United Kingdom.....4058/78--

Column 10, lines 14, 18 and 44, change "13" to --130--.
Column 11, line 27, delete ",constructed and"
Column 13, line 43, change "proving" to --providing--.

Figures 2, 6, 9 and 10 should read as shown on the attached sheet.

Signed and Sealed this

Thirteenth Day of July 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,273,051
DATED : June 16, 1981
INVENTOR(S) : Andrew Stratton

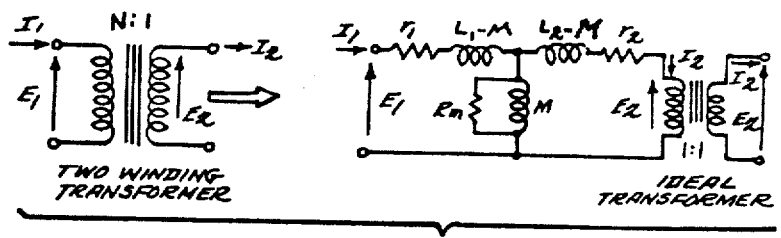

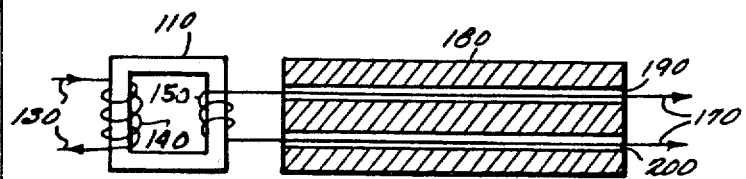

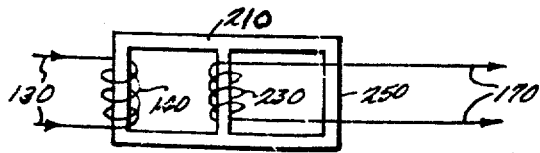

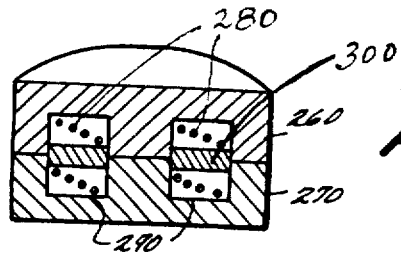

It is certified that error appears in the above—identified patent and that said Letters Patent is hereby corrected as shown below: